United States Patent
Sarkis et al.

(10) Patent No.: US 12,082,291 B2
(45) Date of Patent: Sep. 3, 2024

(54) SENSING FOR SIDELINK DISCONTINUOUS RECEPTION (DRX)

(71) Applicant: QUALCOMM Incorporated, San Diego, CA (US)

(72) Inventors: Gabi Sarkis, San Diego, CA (US); Wanshi Chen, San Diego, CA (US); Tien Viet Nguyen, Bridgewater, NJ (US); Seyedkianoush Hosseini, San Diego, CA (US); Sourjya Dutta, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/444,625

(22) Filed: Aug. 6, 2021

(65) Prior Publication Data

US 2023/0039782 A1    Feb. 9, 2023

(51) Int. Cl.
| | |
|---|---|
| *H04W 76/28* | (2018.01) |
| *H04W 52/02* | (2009.01) |
| *H04W 72/23* | (2023.01) |
| *H04W 72/25* | (2023.01) |
| *H04W 74/0808* | (2024.01) |

(52) U.S. Cl.
CPC ....... *H04W 76/28* (2018.02); *H04W 52/0235* (2013.01); *H04W 72/23* (2023.01); *H04W 72/25* (2023.01); *H04W 74/0808* (2013.01)

(58) Field of Classification Search
None
See application file for complete search history.

(56) References Cited

U.S. PATENT DOCUMENTS

| | | | | |
|---|---|---|---|---|
| 2021/0360532 A1* | 11/2021 | Jiang | ............... | H04W 52/0235 |
| 2022/0039017 A1* | 2/2022 | You | ............... | H04W 52/0235 |
| 2022/0124623 A1* | 4/2022 | Seo | ............... | H04W 52/02 |
| 2022/0159760 A1* | 5/2022 | Parron | ............... | H04W 40/22 |
| 2022/0210739 A1* | 6/2022 | Yi | ............... | H04L 5/0037 |
| 2022/0346180 A1* | 10/2022 | Tseng | ............... | H04W 76/14 |
| 2022/0400469 A1* | 12/2022 | Li | ............... | H04W 74/0808 |
| 2023/0025259 A1* | 1/2023 | Farag | ............... | H04W 74/0808 |
| 2023/0106109 A1* | 4/2023 | Zhang | ............... | H04L 5/0053 |
| | | | | 370/336 |
| 2023/0371050 A1* | 11/2023 | Van Phan | ............... | H04W 72/51 |
| 2023/0380005 A1* | 11/2023 | Ko | ............... | H04W 72/25 |

(Continued)

FOREIGN PATENT DOCUMENTS

WO    2021146940 A1    7/2021

OTHER PUBLICATIONS

Interdigital, Inc: "Sidelink Resource Allocation for Power Saving", R1-2105674, 3GPP TSG RAN WG1 #105-e, e-Meeting, May 10-27, 2021, 8 Pages.

(Continued)

*Primary Examiner* — Jutai Kao
(74) *Attorney, Agent, or Firm* — Harrity & Harrity LLP / Qualcomm

(57) ABSTRACT

Various aspects of the present disclosure generally relate to wireless communication. In some aspects, a user equipment (UE) may receive a configuration for sidelink discontinuous reception (DRX) that indicates a DRX on duration. The UE may selectively perform sensing for sidelink resource selection outside of the DRX on duration. Numerous other aspects are described.

30 Claims, 10 Drawing Sheets

(56) References Cited

U.S. PATENT DOCUMENTS

2024/0015830 A1* 1/2024 Hong ................ H04W 4/40
2024/0015841 A1* 1/2024 Ji ................ H04W 74/0808

OTHER PUBLICATIONS

NTT Docomo, Inc: "Discussion on Sidelink Resource Allocation for Power Saving", R1-2103592, 3GPP TSG RAN WG1 #104bis-e, e-Meeting, Apr. 12-20, 2021, pp. 1-16.

NTT Docomo, Inc: "Discussion on Sidelink Resource Allocation for Power Saving", R1-2105718, 3GPP TSG RAN WG1 #105-e, e-Meeting, May 10-27, 2021, pp. 1-18.

* cited by examiner

SENSING FOR SIDELINK DISCONTINUOUS RECEPTION (DRX)

FIELD OF THE DISCLOSURE

Aspects of the present disclosure generally relate to wireless communication and to techniques and apparatuses for sensing for sidelink discontinuous reception (DRX).

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to an apparatus for wireless communication at a user equipment (UE). The apparatus may include a memory and one or more processors coupled to the memory. The one or more processors may be configured to receive a configuration for sidelink discontinuous reception (DRX) that indicates a DRX on duration. The one or more processors may be configured to selectively perform sensing for sidelink resource selection outside of the DRX on duration.

Some aspects described herein relate to a method of wireless communication performed by an apparatus of a UE. The method may include receiving a configuration for sidelink DRX that indicates a DRX on duration. The method may include selectively performing sensing for sidelink resource selection outside of the DRX on duration.

Some aspects described herein relate to a non-transitory computer-readable medium that stores a set of instructions for wireless communication by a UE. The set of instructions, when executed by one or more processors of the UE, may cause the UE to receive a configuration for sidelink DRX that indicates a DRX on duration. The set of instructions, when executed by one or more processors of the UE, may cause the UE to selectively perform sensing for sidelink resource selection outside of the DRX on duration.

Some aspects described herein relate to an apparatus for wireless communication. The apparatus may include means for receiving a configuration for sidelink DRX that indicates a DRX on duration. The apparatus may include means for selectively performing sensing for sidelink resource selection outside of the DRX on duration.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
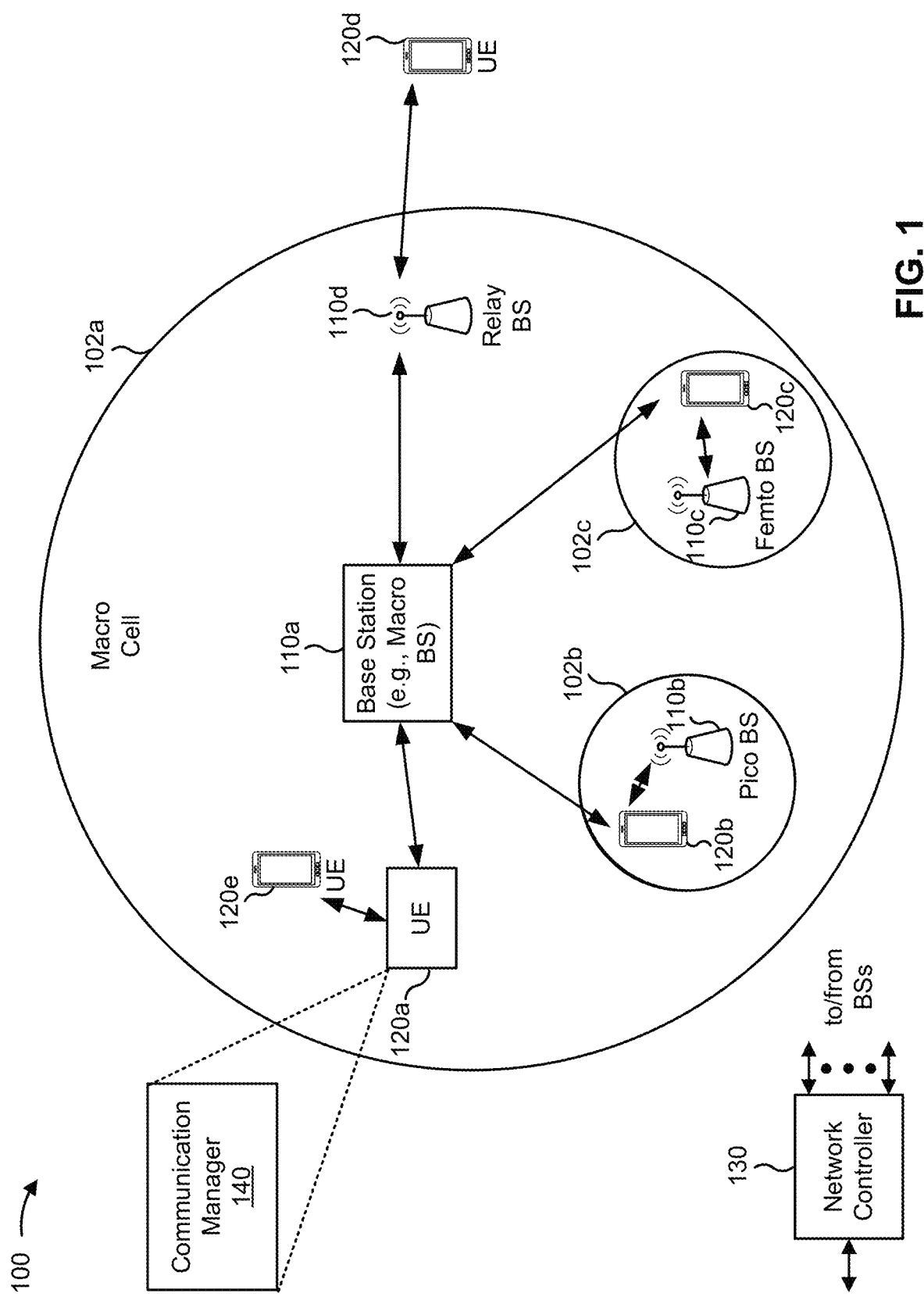
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may receive a configuration for sidelink discontinuous reception (DRX) that indicates a DRX on duration; and selectively perform sensing for sidelink resource selection outside of the DRX on duration. Additionally, or alternatively, the communication manager 140 may perform one or more other operations described herein.

As indicated above, FIG. 1 is provided as an example. Other examples may differ from what is described with regard to FIG. 1.

Figure 2:
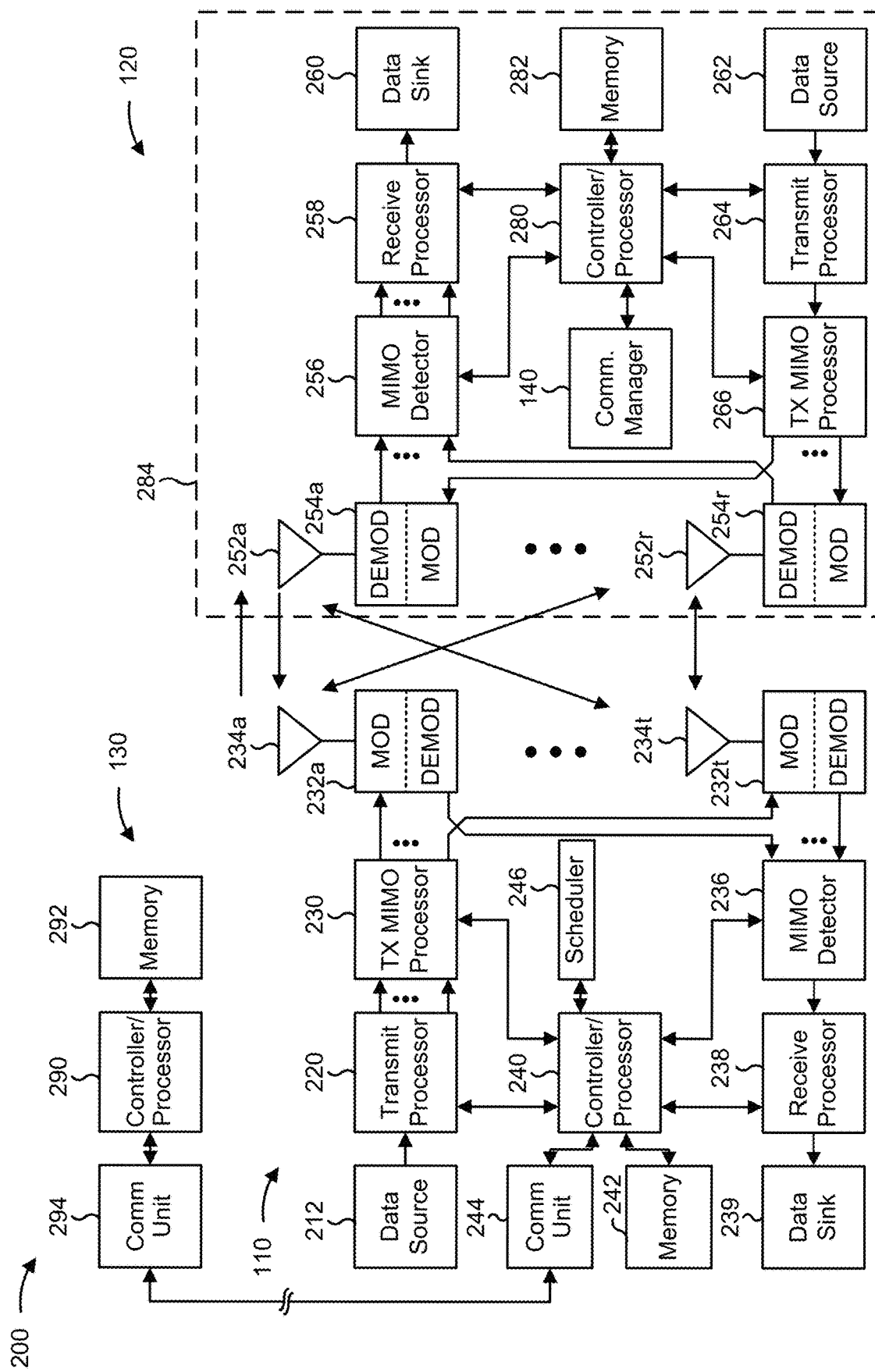
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 6-8).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem (s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 6-8).

The controller/processor 240 of the base station 110, the controller/processor 280 of the UE 120, and/or any other component(s) of FIG. 2 may perform one or more techniques associated with sensing for sidelink DRX, as described in more detail elsewhere herein. For example, the controller/processor 240 of the base station 110, the controller/processor 280 of the UE 120, and/or any other component(s) of FIG. 2 may perform or direct operations of, for example, process 700 of FIG. 7, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 700 of FIG. 7, and/or other processes as described herein. In some examples, executing instructions may include running the instructions, converting the instructions, compiling the instructions, and/or interpreting the instructions, among other examples.

In some aspects, the UE 120 includes means for receiving a configuration for sidelink DRX that indicates a DRX on duration; and/or means for selectively performing sensing for sidelink resource selection outside of the DRX on duration. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3A:
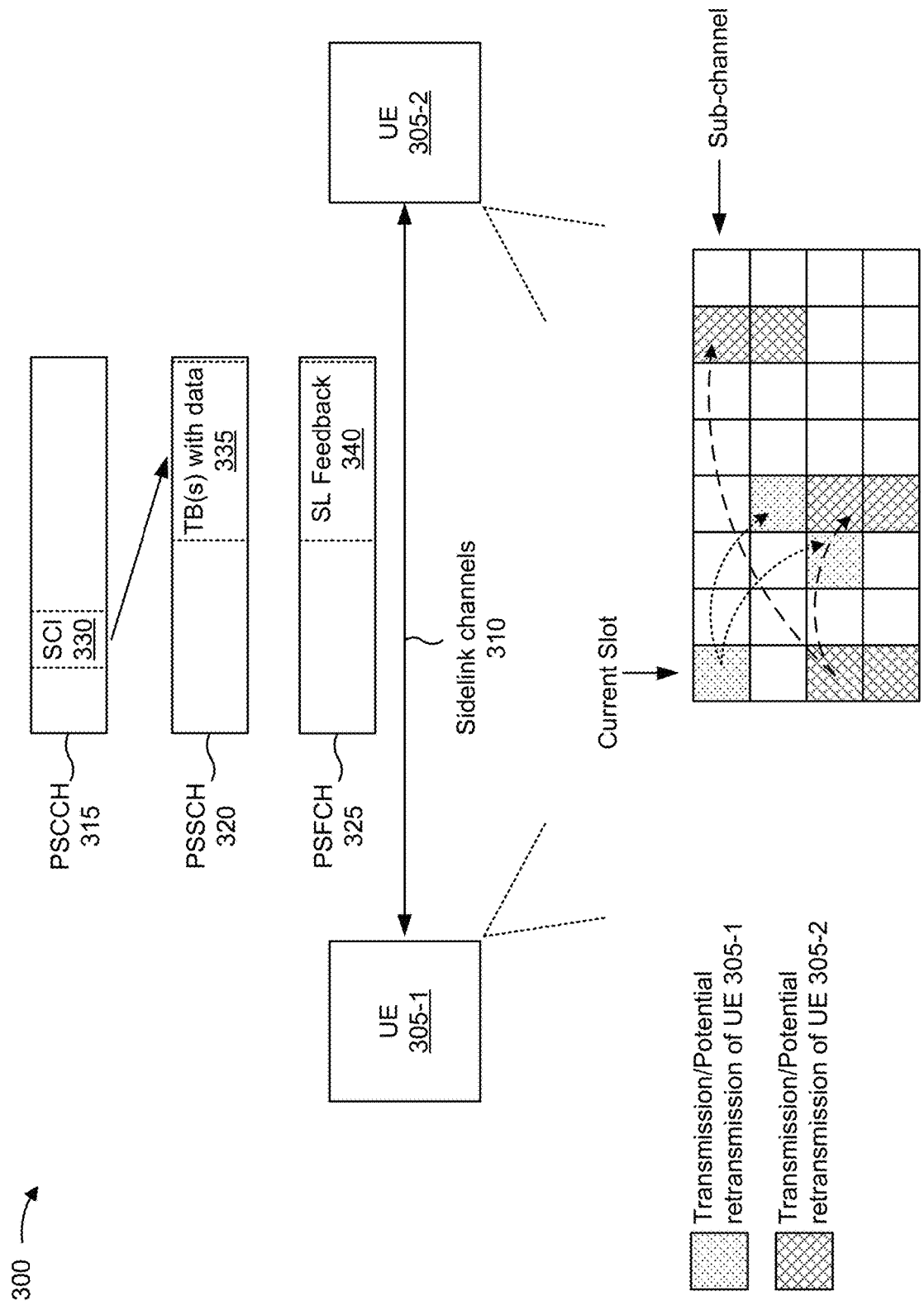
FIG. 3A is a diagram illustrating an example of sidelink communications, in accordance with the present disclosure.

FIG. 3A is a diagram illustrating an example 300 of sidelink communications, in accordance with the present disclosure.

As shown in FIG. 3A, a first UE 305-1 may communicate with a second UE 305-2 (and one or more other UEs 305) via one or more sidelink channels 310. The UEs 305-1 and 305-2 may communicate using the one or more sidelink channels 310 for P2P communications, D2D communications, V2X communications (e.g., which may include V2V communications, V2I communications, and/or V2P communications) and/or mesh networking. In some examples, the UEs 305 (e.g., UE 305-1 and/or UE 305-2) may correspond to one or more other UEs described elsewhere herein, such as UE 120. In some examples, the one or more sidelink channels 310 may use a PC5 interface and/or may operate in a high frequency band (e.g., the 5.9 GHz band). Additionally, or alternatively, the UEs 305 may synchronize timing of transmission time intervals (TTIs) (e.g., frames, subframes, slots, or symbols) using global navigation satellite system (GNSS) timing.

As further shown in FIG. 3A, the one or more sidelink channels 310 may include a physical sidelink control channel (PSCCH) 315, a physical sidelink shared channel (PSSCH) 320, and/or a physical sidelink feedback channel (PSFCH) 325. The PSCCH 315 may be used to communicate control information, similar to a physical downlink control channel (PDCCH) and/or a physical uplink control channel (PUCCH) used for cellular communications with a base station 110 via an access link or an access channel. The PSSCH 320 may be used to communicate data, similar to a physical downlink shared channel (PDSCH) and/or a physical uplink shared channel (PUSCH) used for cellular communications with a base station 110 via an access link or an access channel. For example, the PSCCH 315 may carry sidelink control information (SCI) 330, which may indicate various control information used for sidelink communications, such as one or more resources (e.g., time resources, frequency resources, and/or spatial resources) where a transport block (TB) 335 may be carried on the PSSCH 320. The TB 335 may include data. The PSFCH 325 may be used to communicate sidelink feedback 340, such as hybrid automatic repeat request (HARQ) feedback (e.g., acknowledgement or negative acknowledgement (ACK/NACK) information), transmit power control (TPC), and/or a scheduling request (SR).

Although shown on the PSCCH 315, in some examples, the SCI 330 may include multiple communications in different stages, such as a first stage SCI (SCI-1) and a second stage SCI (SCI-2). The SCI-1 may be transmitted on the PSCCH 315. The SCI-2 may be transmitted on the PSSCH 320. The SCI-1 may include, for example, an indication of one or more resources (e.g., time resources, frequency resources, and/or spatial resources) on the PSSCH 320, information for decoding sidelink communications on the PSSCH, a quality of service (QoS) priority value, a resource reservation period, a PSSCH demodulation reference signal (DMRS) pattern, an SCI format for the SCI-2, a beta offset for the SCI-2, a quantity of PSSCH DMRS ports, and/or a modulation and coding scheme (MCS). The SCI-2 may include information associated with data transmissions on the PSSCH 320, such as a hybrid automatic repeat request (HARQ) process ID, a new data indicator (NDI), a source identifier, a destination identifier, and/or a channel state information (CSI) report trigger.

In some examples, the one or more sidelink channels 310 may use resource pools. For example, a scheduling assignment (e.g., included in SCI 330) may be transmitted in sub-channels using specific resource blocks (RBs) across time. In some examples, data transmissions (e.g., on the PSSCH 320) associated with a scheduling assignment may occupy adjacent RBs in the same subframe as the scheduling assignment (e.g., using frequency division multiplexing). In some examples, a scheduling assignment and associated data transmissions are not transmitted on adjacent RBs.

In some examples, a UE 305 may operate using a transmission mode where resource selection and/or scheduling is performed by the UE 305 (e.g., rather than a base station 110). This transmission mode may be referred to as Mode 2. In some examples, the UE 305 may perform resource selection and/or scheduling by sensing channel availability for transmissions, as described in connection with FIGS. 4A-4B. For example, the UE 305 may measure a received signal strength indicator (RSSI) parameter (e.g., a sidelink-RSSI (S-RSSI) parameter) associated with various sidelink channels, may measure a reference signal received power (RSRP) parameter (e.g., a PSSCH-RSRP parameter) associated with various sidelink channels, and/or may measure a reference signal received quality (RSRQ) parameter (e.g., a PSSCH-RSRQ parameter) associated with various sidelink channels, and may select a channel for transmission of a sidelink communication based at least in part on the measurement(s).

Additionally, or alternatively, the UE 305 may perform resource selection and/or scheduling using SCI 330 received in the PSCCH 315, which may indicate occupied resources and/or channel parameters. Additionally, or alternatively, the UE 305 may perform resource selection and/or scheduling by determining a channel busy rate (CBR) associated with various sidelink channels, which may be used for rate control (e.g., by indicating a maximum number of resource blocks that the UE 305 can use for a particular set of subframes).

In the transmission mode where resource selection and/or scheduling is performed by a UE 305 (i.e., Mode 2), the UE 305 may generate sidelink grants, and may transmit the grants in SCI 330. A sidelink grant may indicate, for example, one or more parameters (e.g., transmission parameters) to be used for an upcoming sidelink transmission, such as one or more resource blocks to be used for the upcoming sidelink transmission on the PSSCH 320 (e.g., for TBs 335), one or more subframes to be used for the upcoming sidelink transmission, and/or a modulation and coding scheme (MCS) to be used for the upcoming sidelink transmission. In some examples, a UE 305 may generate a sidelink grant that indicates one or more parameters for semi-persistent scheduling (SPS), such as a periodicity of a sidelink transmission. Additionally, or alternatively, the UE 305 may generate a sidelink grant for event-driven scheduling, such as for an on-demand sidelink message.

As described above, in sidelink communication (e.g., NR sidelink), resource allocation may be reservation based. For example, as shown in FIG. 3A, a UE 305 may perform a transmission to reserve resources in a current slot and in up to two future slots (e.g., for retransmission). As described above, the reservation information may be carried in SCI 330. A resource allocation for a reservation may be in a unit of a sub-channel in a frequency domain (e.g., the resource allocation may include one or more sub-channels), and the resource allocation may be limited to one slot in a time domain. A resource reservation may be aperiodic or periodic. As described above, a UE 305 may signal a period (e.g., which may have a value between 0 milliseconds (ms) and 1000 ms) of a resource reservation in SCI 330. In some cases, periodic resource reservation and signaling may be disabled for a UE 305 by a configuration (e.g., a pre-configuration) for the UE 305.

As indicated above, FIG. 3A is provided as an example. Other examples may differ from what is described with respect to FIG. 3A.

Figure 3B:
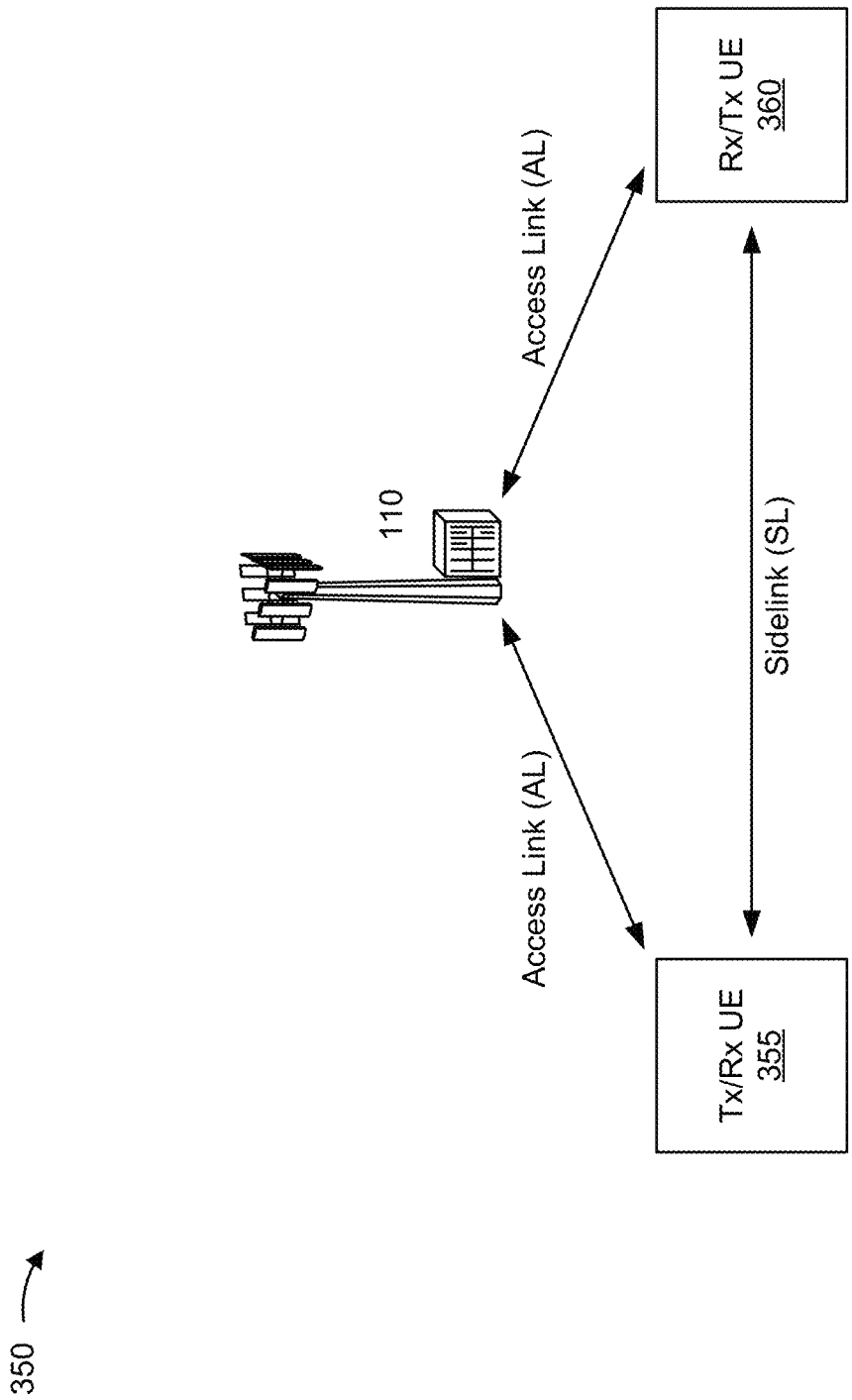
FIG. 3B is a diagram illustrating an example of sidelink communications and access link communications, in accordance with the present disclosure.

FIG. 3B is a diagram illustrating an example 350 of sidelink communications and access link communications, in accordance with the present disclosure.

As shown in FIG. 3B, a transmitter (Tx)/receiver (Rx) UE 355 and an Rx/Tx UE 360 may communicate with one another via a sidelink, as described above in connection with FIG. 3A. As further shown, in some sidelink modes, a base station 110 may communicate with the Tx/Rx UE 355 via a first access link. Additionally, or alternatively, in some sidelink modes, the base station 110 may communicate with the Rx/Tx UE 360 via a second access link. The Tx/Rx UE 355 and/or the Rx/Tx UE 360 may correspond to one or more UEs described elsewhere herein, such as the UE 120 of FIG. 1. Thus, a direct link between UEs 120 (e.g., via a PC5 interface) may be referred to as a sidelink, and a direct link between a base station 110 and a UE 120 (e.g., via a Uu interface) may be referred to as an access link. Sidelink communications may be transmitted via the sidelink, and access link communications may be transmitted via the access link. An access link communication may be either a downlink communication (from a base station 110 to a UE 120) or an uplink communication (from a UE 120 to a base station 110).

As indicated above, FIG. 3B is provided as an example. Other examples may differ from what is described with respect to FIG. 3B.

Figure 4A:
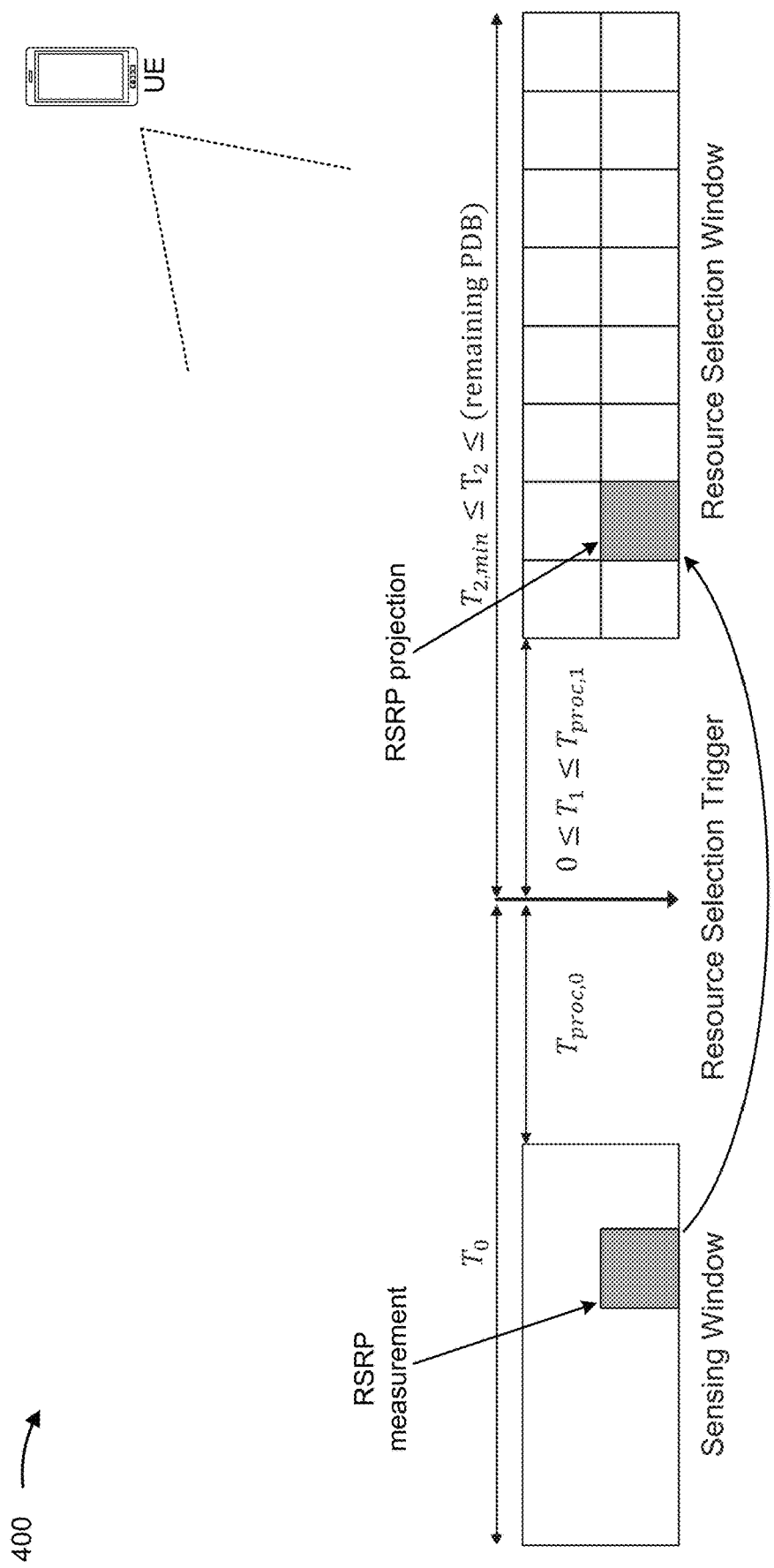
FIGS. 4A-4B are diagrams illustrating examples of sidelink sensing, in accordance with the present disclosure.

FIG. 4A is a diagram illustrating an example 400 of sidelink sensing, in accordance with the present disclosure. As shown in FIG. 4A, a UE (e.g., a UE 120, a UE 305, a UE 355, and/or a UE 360) may use a sensing procedure to select resources for sidelink communication, such as described in connection with FIG. 3A.

As shown in FIG. 4A, a UE may perform a sensing procedure in a sensing window. A size $T_0$ of the sensing window may be configured for the UE. In some cases, the sensing window may be 100 ms (e.g., for aperiodic resource reservation) or 1100 ms (e.g., for periodic resource reservation). In NR sidelink, a UE may use a sensing procedure for aperiodic or periodic resource reservation.

According to the sensing procedure, the UE may decode control messages relating to resource reservations of other UEs, as well as perform measurements (e.g., RSRP measurements) of one or more sidelink channels (e.g., one or more sub-channels associated with the resource reservations). The UE may perform the measurements in the sensing window. As shown, the sensing window may include a processing time $T_{proc,0}$ following the measurements. The measurements (e.g., RSRP measurements) in the sensing window may be projected onto the resource reservations in the resource selection window, as shown.

As shown in FIG. 4A, the UE may determine to select resources for a sidelink communication based at least in part on a resource selection trigger. For example, resource selection may be triggered when the UE has a packet that is to be transmitted. Based at least in part on the resource selection trigger, the UE may determine one or more resources that are available for selection in the resource selection window. That is, the UE may determine the one or more available resources based at least in part on the sensing procedure performed by the UE (e.g., based at least in part on the measurements performed by the UE in the sensing window). For example, the sensing procedure may provide an indication of resources in the resource selection window that are occupied and/or resources in the resource selection window associated with high interference. In some examples, the UE may compare the measurements projected onto the resource selection window with a threshold. The UE may increase the threshold until a percentage (e.g., having a configurable value) of the resources are associated with measurements below the threshold. The UE may determine that resources associated with measurements above the threshold are occupied.

A size $T_2$ of the resource selection window may be greater than or equal to a time $T_{2,min}$, which may have a value configured for the UE based at least in part on a priority of the UE, and less than or equal to a remaining packet delay budget (PDB) of the UE. The resource selection window may also include a time period $T_1$, which may have a value from 0 to a processing time $T_{proc,1}$.

As indicated above, FIG. 4A is provided as an example. Other examples may differ from what is described with respect to FIG. 4A.

Figure 4B:
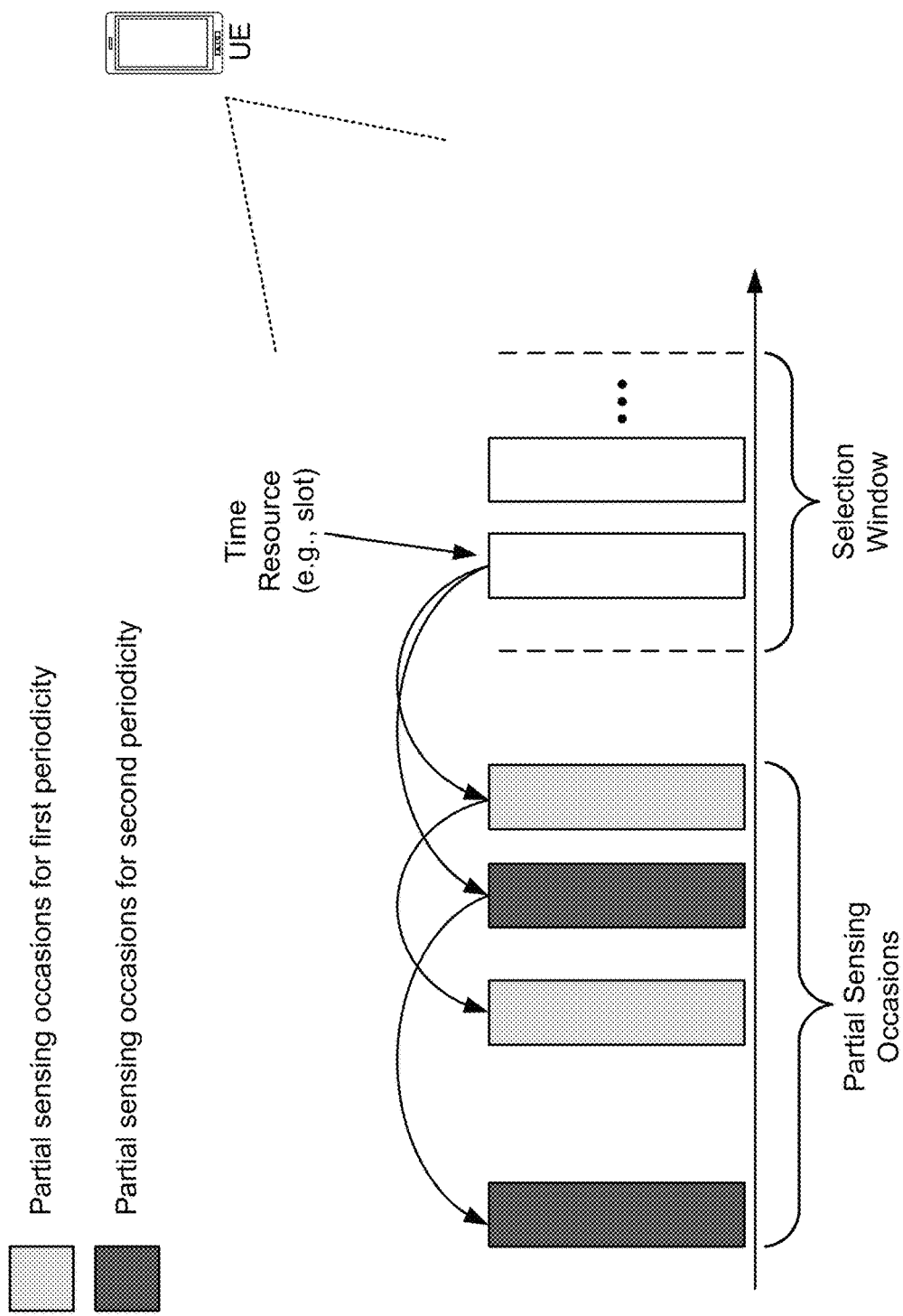

FIG. 4B is a diagram illustrating an example 450 of sidelink sensing, in accordance with the present disclosure. As shown in FIG. 4B, a UE (e.g., a UE 120, a UE 305, a UE 355, and/or a UE 360) may use a partial sensing procedure to select resources for sidelink communication, such as described in connection with FIG. 3A.

In some examples, partial sensing may be used to sense periodic interference associated with periodic transmissions. According to the partial sensing procedure, the UE may perform sensing in a set of partial sensing occasions, where the partial sensing occasions are separated from one another by time gaps. Thus, in partial sensing, the UE does not perform sensing continuously in a sensing window (such sensing may be referred to as "full sensing"), as described in connection with FIG. 4A. The partial sensing occasions may be related to a resource (e.g., a time resource, such as a slot) in a resource selection window in which the UE is to perform a transmission. For example, a set of partial sensing occasions may include a first set of partial sensing occasions with a first time periodicity relative to (e.g., before) the resource in the resource selection window and/or a second set of partial sensing occasions with a second time periodicity relative to (e.g., before) the resource in the resource selection window. The time periodicities that may be monitored by the UE in connection with the partial sensing occasions may be indicated in a list of allowable resource reservation periodicities (e.g., sl-ResourceReservePeriodList).

As indicated above, FIG. 4B is provided as an example. Other examples may differ from what is described with respect to FIG. 4B.

Figure 5:
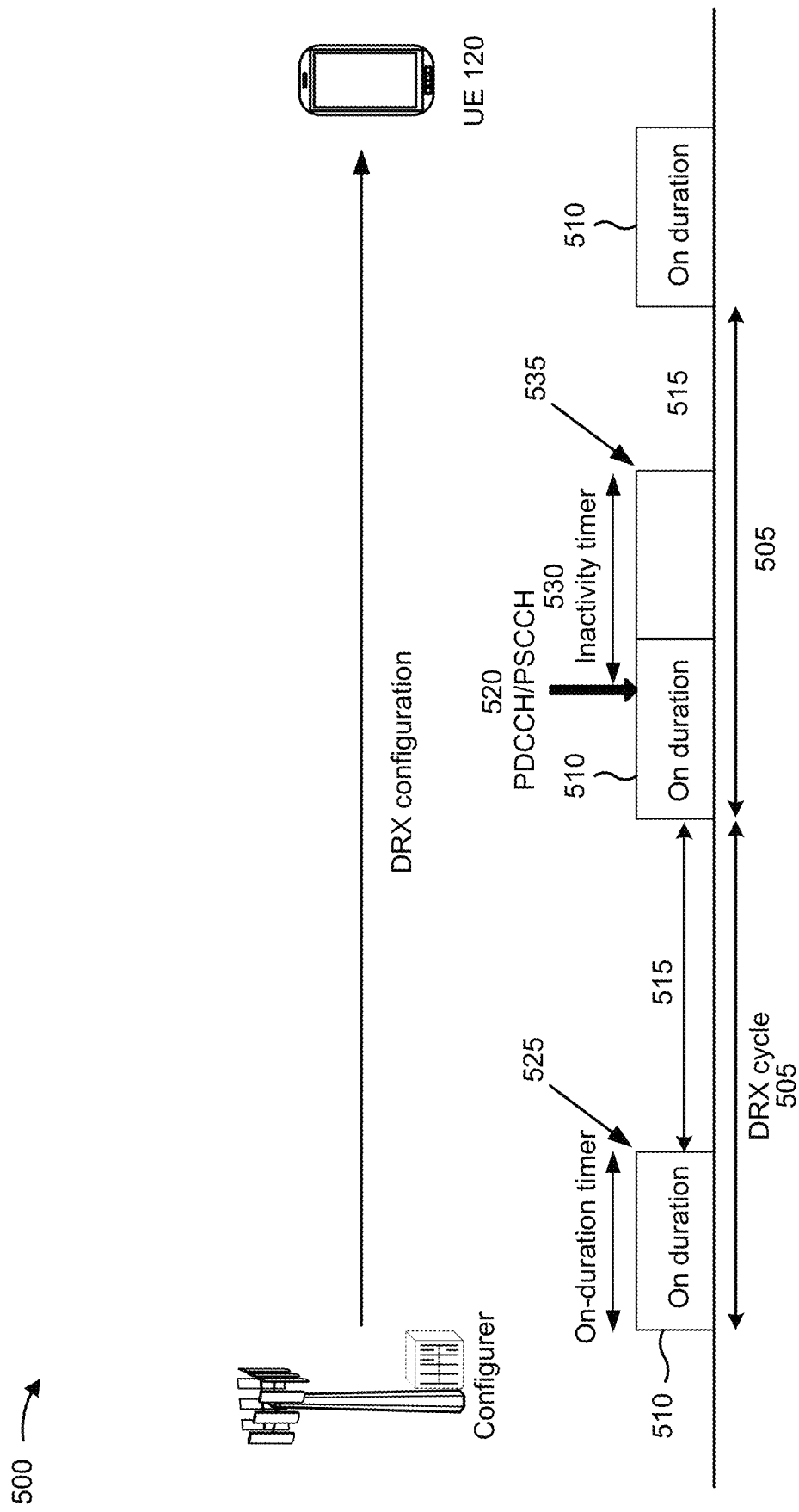
FIG. 5 is a diagram illustrating an example of a discontinuous reception (DRX) configuration, in accordance with the present disclosure.

FIG. 5 is a diagram illustrating an example 500 of a DRX configuration, in accordance with the present disclosure.

As shown in FIG. 5, a configurer (e.g., a base station 110 or a UE 120) may transmit a DRX configuration (e.g., an access link DRX configuration and/or a sidelink DRX configuration) to a UE 120 to configure a DRX cycle 505 for the UE 120. The UE 120 may correspond to UE 305, UE 355, and/or UE 360, as described herein. A DRX cycle 505 may include a DRX on duration 510 (e.g., during which a UE 120 is awake or in an active state) and an opportunity to enter a DRX sleep state 515 (e.g., a power-saving mode). The time during which the UE 120 is configured to be in an active state during the DRX on duration 510 plus any extension of the on duration 510 due to an inactivity timer (e.g., based at least in part on the UE 120 receiving particular signals, such as a signal indicating that the UE 120 is to wait for a retransmission) may be referred to as an active time, and the time during which the UE 120 is configured to be in the DRX sleep state 515 may be referred to as an inactive time. As described herein, the UE 120 may monitor a control channel (e.g., a PDCCH and/or a PSSCH) during the active time and may refrain from monitoring the control channel during the inactive time.

During the DRX on duration 510, the UE 120 may monitor a control channel, as shown by reference number 520. For example, the UE 120 may monitor the control channel for control information (e.g., downlink control information (DCI) and/or SCI) pertaining to the UE 120. If the UE 120 does not detect and/or successfully decode any control channel communications intended for the UE 120 during the DRX on duration 510, then the UE 120 may enter the sleep state 515 (e.g., for the inactive time) at the end of the DRX on duration 510, as shown by reference number 525. In this way, the UE 120 may conserve battery power and reduce power consumption (e.g., because the UE 120 is only receiving signals part of the time). As shown, the DRX cycle 505 may repeat with a configured periodicity according to the DRX configuration.

If the UE 120 detects and/or successfully decodes a control channel communication intended for the UE 120, then the UE 120 may remain in an active state (e.g., awake) for the duration of a DRX inactivity timer 530 (e.g., which may extend into the configured inactive time of the current DRX cycle). The UE 120 may start the DRX inactivity timer 530 at a time at which the control channel communication is received (e.g., in a TTI in which the control channel communication is received, such as a slot or a subframe). The UE 120 may remain in the active state until the DRX inactivity timer 530 expires, at which time the UE 120 may enter the sleep state 515 (e.g., for the remainder of the inactive time of the current DRX cycle), as shown by reference number 535. During the duration of the DRX inactivity timer 530, the UE 120 may continue to monitor for control channel communications, may obtain a data communication (e.g., on a data channel, such as a PDSCH and/or a PSSCH) scheduled by the control channel communication, and/or may prepare and/or transmit a communication (e.g., on a PUSCH and/or a PSSCH) scheduled by the control channel communication. The UE 120 may restart the DRX inactivity timer 530 after each detection of a control channel communication for the UE 120 for an initial transmission (e.g., but not for a retransmission). By operating in this manner, the UE 120 may conserve battery power and reduce power consumption by entering the sleep state 515.

In some cases, a UE may perform sensing for sidelink resource reservation during a DRX on duration. If a UE performs sensing outside of a DRX on duration (e.g., during an inactive time), then power savings resulting from DRX may be reduced. However, if a UE is prohibited from performing sensing outside of a DRX on duration, then the performance of sidelink communications may be degraded. Some techniques and apparatuses described herein enable a UE to selectively perform sensing outside of a DRX on duration. In some aspects, the described techniques enable a UE to determine whether to perform sensing outside of a DRX on duration. In this way, the UE may conserve power using DRX operation, while improving the performance of sidelink communications.

As indicated above, FIG. 5 is provided as an example. Other examples may differ from what is described with respect to FIG. 5.

Figure 6:
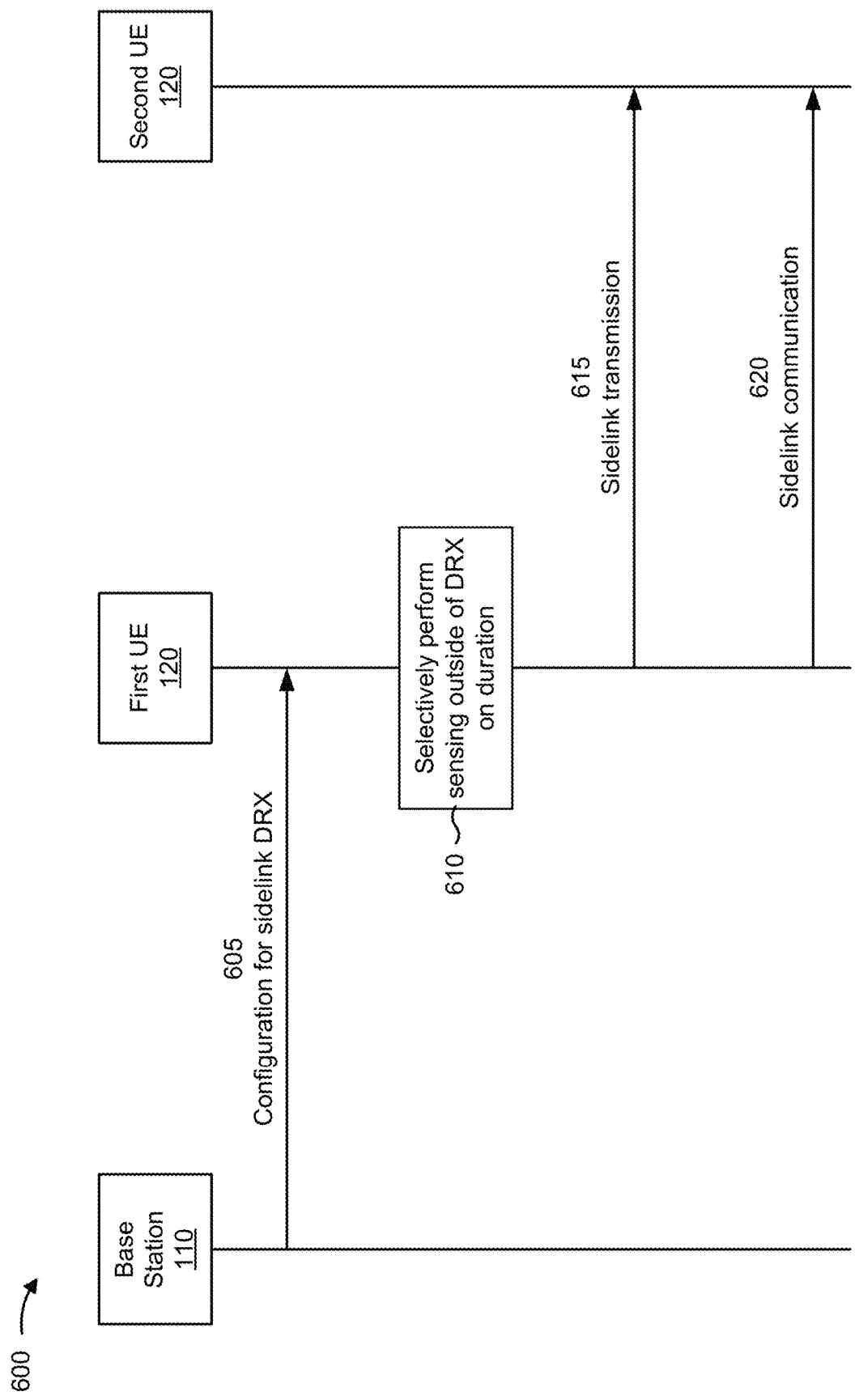
FIG. 6 is a diagram illustrating an example associated with sensing for sidelink DRX, in accordance with the present disclosure.

FIG. 6 is a diagram illustrating an example 600 associated with sensing for sidelink DRX, in accordance with the present disclosure. As shown in FIG. 6, example 600 may include a base station 110, a first UE 120 (which may be referred to as "the UE 120" in connection with example 600), and a second UE 120 (which may be referred to as "the other UE 120" in connection with example 600). The base station 110 may communicate with the UE 120 or the other UE 120 via an access link, as described herein. The UE 120 and the other UE 120 may communicate via a sidelink, as described herein. The UE 120 and/or the other UE 120 may correspond to a UE 305, a UE 355, and/or a UE 360, as described herein.

As shown by reference number 605, the base station 110 may transmit, and the UE 120 may receive, a configuration for sidelink DRX. The sidelink DRX configuration may indicate a DRX cycle for the UE 120, as described herein. For example, the sidelink DRX configuration may indicate a DRX on duration (e.g., an active time period) during which the UE 120 is to operate in an active state, and an inactive time period during which the UE 120 is to operate in a sleep state. In some aspects, the UE 120 may receive the sidelink DRX configuration from the other UE 120. The UE 120 may operate in a DRX mode, in connection with sidelink communication, in accordance with the sidelink DRX configuration.

As shown by reference number 610, the UE 120 may selectively perform sensing outside of the DRX on duration (e.g., outside of one or more periodic DRX on durations configured for the UE 120). In other words, the UE 120 may (e.g., may be required to) wake up (e.g., operate in an active state) outside of the DRX on duration based at least in part on satisfaction of one or more conditions and/or based at least in part on signaling received by the UE 120, as described herein. In some aspects, to perform sensing outside of the DRX on duration, the UE 120 may perform reception (e.g., decoding of control messages) outside of the DRX on duration for use in performing sensing. That is, the reception may be for the purpose of sensing. Thus, when performing reception outside of the DRX on duration, the UE 120 may decode only SCI-1 (e.g., and may refrain from decoding other sidelink communications, such as SCI-2, data transmissions, or the like). The UE 120 may perform sensing "outside" of the DRX on duration by performing sensing during a time period, or at a time, that does not overlap with a time period of the DRX on duration.

In some aspects, the UE 120 may perform sensing outside of the DRX on duration prior to expiration of an inactivity timer (e.g., the UE 120 may perform sensing during an active time that is outside of the DRX on duration). For example, the UE 120 may initiate the inactivity timer during the DRX on duration, as described herein, and the UE 120 may perform sensing during a time period outside of the DRX on duration if the inactivity timer is running (e.g., has not expired).

In some aspects, the UE 120 may perform sensing outside of the DRX on duration (e.g., outside of the DRX on duration of a current DRX cycle) if a PDB of a packet (e.g., a sidelink communication, a transport block, or the like), to be transmitted by the UE 120, necessitates transmission of the packet before a subsequent DRX on duration (e.g., of a subsequent DRX cycle). This may occur when the PDB is relatively small (e.g., relative to a time period until the subsequent DRX on duration). In some aspects, such as for aperiodic traffic, the UE 120 may perform the sensing, outside of the DRX on duration, after arrival of the packet for transmission by the UE 120 (e.g., after a resource selection trigger, as described herein). In some aspects, such as for periodic traffic, the UE 120 may perform the sensing, outside of the DRX on duration, prior to an anticipated arrival time of the packet (e.g., which may be according to a periodicity of the periodic traffic). In some aspects, information relating to a relationship between an arrival time of a packet, a PDB, and a beginning of a DRX on duration may be configured, specified, or otherwise provisioned, for the UE 120. The UE 120 may use the information to determine whether to perform sensing outside of the DRX on duration. For example, the information may indicate that if the arrival time of the packet, the PDB, and the beginning of the DRX on duration satisfies a condition (e.g., satisfies a particular timing or timeline), then the UE 120 may perform sensing outside of the DRX on duration. In some aspects, information relating to a PDB threshold may be configured, specified, or otherwise provisioned, for the UE 120. For example, the UE 120 may perform sensing outside of the DRX on duration if the PDB of the packet satisfies the PDB threshold.

In some aspects, the UE 120 may perform sensing outside of the DRX on duration based at least in part on a priority associated with a packet for transmission (e.g., an outgoing packet). In some aspects, information relating to a priority threshold may be configured, specified, or otherwise provisioned, for the UE 120. Thus, the UE 120 may perform sensing outside of the DRX on duration if a priority associated with a packet for transmission satisfies the threshold. For example, the UE 120 may perform sensing outside of the DRX on duration for higher priority transmissions and may refrain from performing sensing outside of the DRX on duration for lower priority transmissions.

In some aspects, the UE 120 may perform sensing outside of the DRX on duration based at least in part on a quantity of retransmissions associated with (e.g., intended for) a packet for transmission. In some aspects, information relating to a retransmission threshold may be configured, specified, or otherwise provisioned, for the UE 120. Thus, the UE 120 may perform sensing outside of the DRX on duration if a quantity of retransmissions associated with a packet satisfies the threshold. For example, the UE 120 may perform sensing outside of the DRX on duration for packets or transport blocks associated with a larger quantity of retransmissions and may refrain from performing sensing outside of the DRX on duration for packets or transport blocks associated with a smaller quantity of retransmissions.

In some aspects, the UE 120 may perform sensing outside of the DRX on duration if the UE received an indication that a transmission of the UE conflicts with another transmission of at least one other UE (e.g., the other UE 120). For example, the other UE 120 may transmit, and the UE 120 may receive, the indication. In some aspects, a transmission of the UE 120 conflicts with another transmission of another UE if the transmission and the other transmission overlap (e.g., partially or fully) in time and in frequency or overlap (e.g., partially or fully) in time. In some aspects, the transmission of the UE 120 may indicate a resource reservation. Here, the transmission of the UE may conflict with another transmission of another UE if the transmission conflicts with the other transmission or if the resource reservation indicated by the transmission conflicts with the other transmission or a resource reservation indicated by the other transmission.

In some aspects, the UE 120 may perform sensing outside of the DRX on duration based at least in part on satisfaction of multiple of the aforementioned conditions (e.g., a combination of the aforementioned conditions). For example, the UE 120 may perform sensing outside of the DRX on duration if an inactivity timer is running and if a PDB of a packet necessitates transmission of the packet before a subsequent DRX on duration.

In some aspects, the UE 120 may perform sensing outside of the DRX on duration if the UE is configured to perform sensing outside of the DRX on duration. In some aspects, information relating to whether the UE 120 is to perform sensing outside of the DRX on duration may be configured, specified, or otherwise provisioned, for the UE 120. In some aspects, the information may indicate that the UE 120 is to perform sensing outside of the DRX on duration in connection with a particular sidelink resource pool.

In some aspects, the UE 120 may perform sensing outside of the DRX on duration if the UE 120 received an indication to perform sensing outside of the DRX on duration. In some aspects, the indication may be applicable to one or more DRX cycles. In some aspects, the base station 110 may transmit, and the UE 120 may receive, the indication to perform sensing outside of the DRX on duration (e.g., in a medium access control (MAC) control element (MAC-CE), in a PDCCH communication, or the like). In some aspects, the other UE 120 may transmit, and the UE 120 may receive, the indication to perform sensing outside of the DRX on duration (e.g., in a MAC-CE, in a PC5-radio resource control (RRC) message, or the like). In some aspects, the UE 120 may receive the indication included in a wakeup signal (e.g., a signal received by the UE 120 prior to a DRX on duration indicating that the UE 120 is to wake up for the DRX on duration) and/or in a go-to-sleep signal (e.g., a signal received by the UE 120 in an active state indicating that the UE 120 is to go back into a sleep state). The UE 120 may receive the wakeup signal and/or the go-to-sleep signal from the base station 110 or the other UE 120. In some aspects, the indication included in the wakeup signal and/or the go-to-sleep signal may indicate one or more of: whether the UE is to skip performing reception (e.g., all reception, whether for sensing or otherwise) in an upcoming DRX on duration, whether the UE is to skip performing sensing in an upcoming DRX on duration, whether the UE is to skip performing sensing in an upcoming DRX cycle, or whether the UE is to skip performing sensing after an upcoming DRX on duration (e.g., outside of the upcoming DRX on duration).

In some aspects, the UE 120 may perform sensing outside of the DRX on duration in a subset (e.g., a proper subset) of a set of periodic partial sensing occasions. For example, the UE 120 may perform the sensing in a lesser quantity of sub-channels than a total quantity of sub-channels of the set of periodic partial sensing occasions. As another example, the UE 120 may perform the sensing for less periodicity values than a total set of periodicity values used for the set of periodic partial sensing occasions (e.g., the set of periodic partial sensing occasions may include occasions associated with two different periodicities, and the UE 120 may perform the sensing only for occasions associated with one of the two periodicities). As a further example, the UE 120 may perform the sensing for less occasions than a total set of occasions associated with a periodicity (e.g., the UE 120 may perform the sensing only for a most-recent occasion of a particular periodicity).

In some aspects, the UE 120 may perform sensing outside of the DRX on duration based at least in part on a band in which sidelink communication of the UE is performed. For example, if the band is a licensed band (e.g., an operator-owned band), then the UE 120 may be required to perform sensing outside of the DRX on duration (e.g., when the UE is operating in sidelink Mode 2). As another example, if the band is an unlicensed band, then the UE 120 may be required to perform sensing outside of the DRX on duration (e.g., when the UE is operating in sidelink Mode 2). As a further example, if the band is a dedicated band for sidelink communication, then the UE 120 may be required to perform sensing outside of the DRX on duration (e.g., when the UE is operating in sidelink Mode 2).

Based at least in part on performing sensing outside of the DRX on duration, the UE 120 may identify (e.g., select) one or more resources that are to be used (e.g., that are available) for one or more sidelink transmissions of the UE 120.

As shown by reference number 615, the UE 120 may perform a sidelink transmission. For example, the UE 120 may perform the sidelink transmission (e.g., indicating a resource reservation) based at least in part on performing sensing outside of the DRX on duration. In particular, the UE 120 may perform the sidelink transmission based at least in part on identifying the one or more resources that are to be used for the one or more sidelink transmissions of the UE 120. To perform the sidelink transmission, the UE 120 may transmit, and the other UE 120 may receive, information (e.g., SCI) indicating the resource reservation (e.g., of the one or more resources identified by the UE 120).

As shown by reference number 620, the UE 120 may transmit, and the other UE 120 may receive, one or more sidelink communications. For example, the UE 120 may transmit the one or more sidelink communications in the resource(s) indicated by the resource reservation of the UE 120.

As indicated above, FIG. 6 is provided as an example. Other examples may differ from what is described with respect to FIG. 6.

Figure 7:
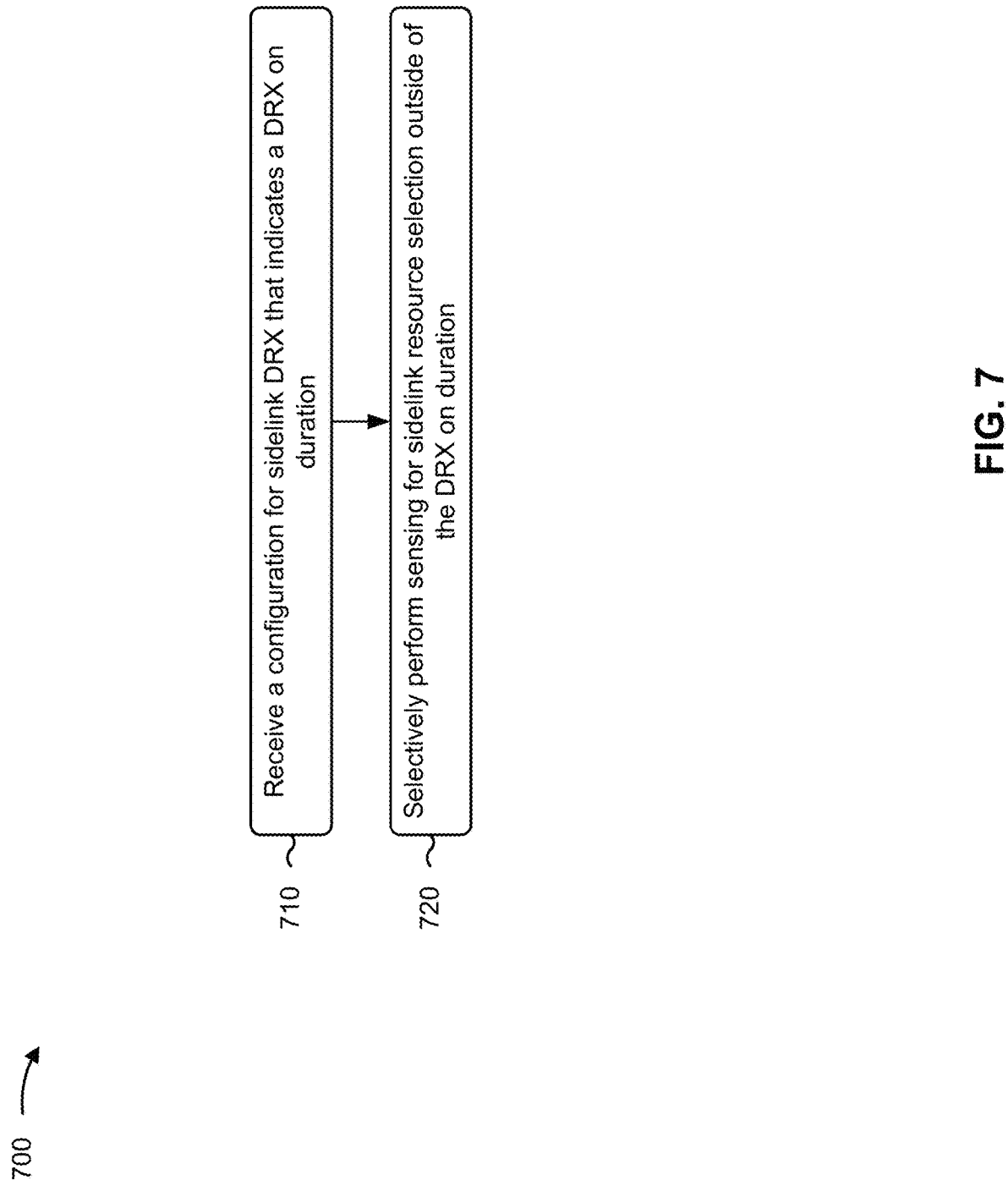
FIG. 7 is a diagram illustrating an example process associated with sensing for sidelink DRX, in accordance with the present disclosure.

FIG. 7 is a diagram illustrating an example process 700 performed, for example, by a UE, in accordance with the present disclosure. Example process 700 is an example where the UE (e.g., UE 120) performs operations associated with sensing for sidelink DRX.

As shown in FIG. 7, in some aspects, process 700 may include receiving a configuration for sidelink DRX that indicates a DRX on duration (block 710). For example, the UE (e.g., using communication manager 140 and/or reception component 802, depicted in FIG. 8) may receive a configuration for sidelink DRX that indicates a DRX on duration, as described above.

As further shown in FIG. 7, in some aspects, process 700 may include selectively performing sensing for sidelink resource selection outside of the DRX on duration (block 720). For example, the UE (e.g., using communication manager 140 and/or sensing component 808, depicted in FIG. 8) may selectively perform sensing for sidelink resource selection outside of the DRX on duration, as described above.

Process 700 may include additional aspects, such as any single aspect or any combination of aspects described below and/or in connection with one or more other processes described elsewhere herein.

In a first aspect, performing sensing outside of the DRX on duration includes performing reception outside of the DRX on duration for use in performing sensing outside of the DRX on duration.

In a second aspect, alone or in combination with the first aspect, sensing is performed outside of the DRX on duration prior to expiration of an inactivity timer.

In a third aspect, alone or in combination with one or more of the first and second aspects, sensing is performed outside of the DRX on duration if a packet delay budget of a packet necessitates transmission of the packet before a subsequent DRX on duration.

In a fourth aspect, alone or in combination with one or more of the first through third aspects, sensing is performed outside of the DRX on duration if a priority associated with a packet for transmission satisfies a threshold.

In a fifth aspect, alone or in combination with one or more of the first through fourth aspects, sensing is performed outside of the DRX on duration if a quantity of retransmissions associated with a packet satisfies a threshold.

In a sixth aspect, alone or in combination with one or more of the first through fifth aspects, sensing is performed outside of the DRX on duration if the UE received an indication that a transmission of the UE conflicts with another transmission of at least one other UE.

In a seventh aspect, alone or in combination with one or more of the first through sixth aspects, sensing is performed outside of the DRX on duration if the UE received an indication to perform sensing outside of the DRX on duration, or if the UE is configured to perform sensing outside of the DRX on duration.

In an eighth aspect, alone or in combination with one or more of the first through seventh aspects, the indication is received from a base station or another UE.

In a ninth aspect, alone or in combination with one or more of the first through eighth aspects, the indication is included in a wakeup signal or a go-to-sleep signal.

In a tenth aspect, alone or in combination with one or more of the first through ninth aspects, the indication included in the wakeup signal or the go-to-sleep signal indicates one or more of whether the UE is to skip performing reception in an upcoming DRX on duration, whether the UE is to skip performing sensing in an upcoming DRX on duration, whether the UE is to skip performing sensing in an upcoming DRX cycle, or whether the UE is to skip performing sensing after an upcoming DRX on duration.

In an eleventh aspect, alone or in combination with one or more of the first through tenth aspects, sensing is performed outside of the DRX on duration in a subset of a set of periodic partial sensing occasions.

In a twelfth aspect, alone or in combination with one or more of the first through eleventh aspects, sensing is performed outside of the DRX on duration based at least in part on a band in which sidelink communication of the UE is performed.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
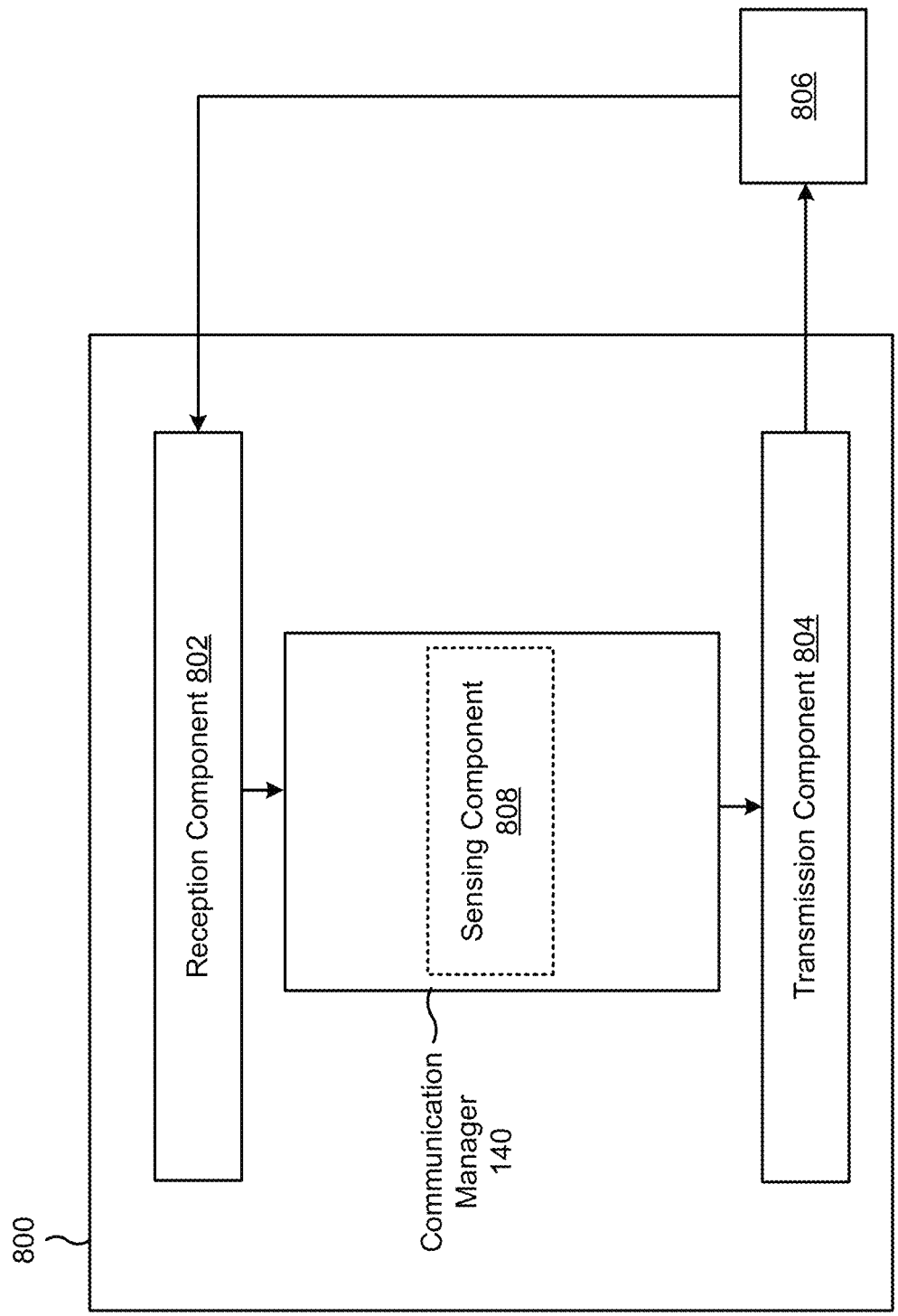
FIG. 8 is a diagram of an example apparatus for wireless communication, in accordance with the present disclosure.

FIG. 8 is a diagram of an example apparatus 800 for wireless communication. The apparatus 800 may be a UE, or a UE may include the apparatus 800. In some aspects, the apparatus 800 includes a reception component 802 and a transmission component 804, which may be in communication with one another (for example, via one or more buses and/or one or more other components). As shown, the apparatus 800 may communicate with another apparatus 806 (such as a UE, a base station, or another wireless communication device) using the reception component 802 and the transmission component 804. As further shown, the apparatus 800 may include the communication manager 140. The communication manager 140 may include a sensing component 808, among other examples.

In some aspects, the apparatus 800 may be configured to perform one or more operations described herein in connection with FIG. 6. Additionally, or alternatively, the apparatus 800 may be configured to perform one or more processes described herein, such as process 700 of FIG. 7, or a combination thereof. In some aspects, the apparatus 800 and/or one or more components shown in FIG. 8 may include one or more components of the UE described in connection with FIG. 2. Additionally, or alternatively, one or more components shown in FIG. 8 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 802 may receive communications, such as reference signals, control information, data communications, or a combination thereof, from the apparatus 806. The reception component 802 may provide received communications to one or more other components of the apparatus 800. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 806. In some aspects, the reception component 802 may include one or more antennas, a modem, a demodulator, a MIMO detector, a receive processor, a controller/processor, a memory, or a combination thereof, of the UE described in connection with FIG. 2.

The transmission component 804 may transmit communications, such as reference signals, control information, data communications, or a combination thereof, to the apparatus 806. In some aspects, one or more other components of the apparatus 806 may generate communications and may provide the generated communications to the transmission component 804 for transmission to the apparatus 806. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 806. In some aspects, the transmission component 804 may include one or more antennas, a modem, a modulator, a transmit MIMO processor, a transmit processor, a controller/processor, a memory, or a combination thereof, of the UE described in connection with FIG. 2. In some aspects, the transmission component 804 may be co-located with the reception component 802 in a transceiver.

The reception component 802 may receive a configuration for sidelink DRX. The configuration for sidelink DRX may indicate a DRX on duration. The sensing component 808 may selectively perform sensing for sidelink resource selection outside of the DRX on duration. In some aspects, the sensing component 808 may select one or more resources for transmission of a sidelink communication. In some aspects, the transmission component 804 may transmit information identifying a reservation of the one or more resources. In some aspects, the transmission component 804 may transmit the sidelink communication in the one or more resources.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally, or alternatively, a set of (one or more) components shown in FIG. 8 may perform one or more functions described as being performed by another set of components shown in FIG. 8.

The following provides an overview of some Aspects of the present disclosure:

Aspect 1: A method of wireless communication performed by an apparatus of a user equipment (UE), comprising: receiving a configuration for sidelink discontinuous reception (DRX) that indicates a DRX on duration; and selectively performing sensing for sidelink resource selection outside of the DRX on duration.

Aspect 2: The method of Aspect 1, wherein performing sensing outside of the DRX on duration comprises: performing reception outside of the DRX on duration for use in performing sensing outside of the DRX on duration.

Aspect 3: The method of any of Aspects 1-2, wherein sensing is performed outside of the DRX on duration prior to expiration of an inactivity timer.

Aspect 4: The method of any of Aspects 1-3, wherein sensing is performed outside of the DRX on duration if a packet delay budget of a packet necessitates transmission of the packet before a subsequent DRX on duration.

Aspect 5: The method of any of Aspects 1-4, wherein sensing is performed outside of the DRX on duration if a priority associated with a packet for transmission satisfies a threshold.

Aspect 6: The method of any of Aspects 1-5, wherein sensing is performed outside of the DRX on duration if a quantity of retransmissions associated with a packet satisfies a threshold.

Aspect 7: The method of any of Aspects 1-6, wherein sensing is performed outside of the DRX on duration if the UE received an indication that a transmission of the UE conflicts with another transmission of at least one other UE.

Aspect 8: The method of any of Aspects 1-7, wherein sensing is performed outside of the DRX on duration if the UE received an indication to perform sensing outside of the DRX on duration, or if the UE is configured to perform sensing outside of the DRX on duration.

Aspect 9: The method of Aspect 8, wherein the indication is received from a base station or another UE.

Aspect 10: The method of any of Aspects 8-9, wherein the indication is included in a wakeup signal or a go-to-sleep signal.

Aspect 11: The method of Aspect 10, wherein the indication included in the wakeup signal or the go-to-sleep signal indicates one or more of: whether the UE is to skip performing reception in an upcoming DRX on duration, whether the UE is to skip performing sensing in an upcoming DRX on duration, whether the UE is to skip performing sensing in an upcoming DRX cycle, or whether the UE is to skip performing sensing after an upcoming DRX on duration.

Aspect 12: The method of any of Aspects 1-11, wherein sensing is performed outside of the DRX on duration in a subset of a set of periodic partial sensing occasions.

Aspect 13: The method of any of Aspects 1-12, wherein sensing is performed outside of the DRX on duration based at least in part on a band in which sidelink communication of the UE is performed.

Aspect 14: An apparatus for wireless communication at a device, comprising a processor; memory coupled with the processor; and instructions stored in the memory and executable by the processor to cause the apparatus to perform the method of one or more of Aspects 1-13.

Aspect 15: A device for wireless communication, comprising a memory and one or more processors coupled to the memory, the one or more processors configured to perform the method of one or more of Aspects 1-13.

Aspect 16: An apparatus for wireless communication, comprising at least one means for performing the method of one or more of Aspects 1-13.

Aspect 17: A non-transitory computer-readable medium storing code for wireless communication, the code comprising instructions executable by a processor to perform the method of one or more of Aspects 1-13.

Aspect 18: A non-transitory computer-readable medium storing a set of instructions for wireless communication, the set of instructions comprising one or more instructions that, when executed by one or more processors of a device, cause the device to perform the method of one or more of Aspects 1-13.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a user equipment (UE), comprising:
one or more memories; and
one or more processors, coupled to the one or more memories, configured to:
receive a configuration for sidelink discontinuous reception (DRX) that indicates a DRX on duration; and
selectively perform sensing for sidelink resource selection during an inactive time of the sidelink DRX in a set of periodic partial sensing occasions only for a most-recent occasion of a periodicity associated with the set of periodic partial sensing occasions based at least in part on whether an indication to perform sensing during the inactive time of the sidelink DRX is received from a network entity,
the periodicity being indicated in a list of allowable sidelink resource reservation periodicities.

2. The apparatus of claim 1, wherein the one or more processors, to perform sensing during the inactive time of the sidelink DRX, are configured to:
perform reception during the inactive time of the sidelink DRX for use in performing sensing during the inactive time of the sidelink DRX.

3. The apparatus of claim 1, wherein the one or more processors, to perform sensing during the inactive time of the sidelink DRX, are configured to:
perform sensing during the inactive time of the sidelink DRX prior to expiration of an inactivity timer.

4. The apparatus of claim 1, wherein the one or more processors, to selectively perform sensing during the inactive time of the sidelink DRX, are configured to:
perform sensing during the inactive time of the sidelink DRX if a packet delay budget of a packet necessitates transmission of the packet before a subsequent DRX on duration.

5. The apparatus of claim 1, wherein the one or more processors, to selectively perform sensing during the inactive time of the sidelink DRX, are configured to:
perform sensing during the inactive time of the sidelink DRX if a priority associated with a packet for transmission satisfies a threshold.

6. The apparatus of claim 1, wherein the one or more processors, to selectively perform sensing during the inactive time of the sidelink DRX, are configured to:
perform sensing during the inactive time of the sidelink DRX if a quantity of retransmissions associated with a packet satisfies a threshold.

7. The apparatus of claim 1, wherein the one or more processors, to selectively perform sensing during the inactive time of the sidelink DRX, are configured to:
perform sensing during the inactive time of the sidelink DRX if the UE received an indication that a transmission of the UE conflicts with another transmission of at least one other UE.

8. The apparatus of claim 1, wherein the one or more processors are further configured to:
receive the indication, to perform sensing during the inactive time of the sidelink DRX, from another UE.

9. The apparatus of claim 1, wherein the indication to perform sensing during the inactive time of the sidelink DRX is included in a wakeup signal or a go-to-sleep signal.

10. The apparatus of claim 9, wherein the indication to perform sensing during the inactive time of the sidelink DRX and included in the wakeup signal or the go-to-sleep signal indicates one or more of:
whether the UE is to skip performing reception in an upcoming DRX on duration,
whether the UE is to skip performing sensing in an upcoming DRX on duration,
whether the UE is to skip performing sensing in an upcoming DRX cycle, or
whether the UE is to skip performing sensing after an upcoming DRX on duration.

11. The apparatus of claim 1, wherein the one or more processors, to perform sensing during the inactive time of the sidelink DRX, are configured to:
perform sensing during the inactive time of the sidelink DRX based at least in part on a band in which sidelink communication of the UE is performed.

12. The apparatus of claim 1, wherein the one or more processors, to perform sensing during the inactive time of the sidelink DRX, are configured to:
perform sensing during the inactive time of the sidelink DRX while operating in an active state.

13. A method of wireless communication performed by an apparatus of a user equipment (UE), comprising:
receiving a configuration for sidelink discontinuous reception (DRX) that indicates a DRX on duration; and
selectively performing sensing for sidelink resource selection during an inactive time of the sidelink DRX in a set of periodic partial sensing occasions only for a most-recent occasion of a periodicity associated with the set of periodic partial sensing occasions based at least in part on whether an indication to perform sensing during the inactive time of the sidelink DRX is received from a network entity,
the periodicity being indicated in a list of allowable sidelink resource reservation periodicities.

14. The method of claim 13, wherein performing sensing during the inactive time of the sidelink DRX comprises:
performing reception during the inactive time of the sidelink DRX for use in performing sensing during the inactive time of the sidelink DRX.

15. The method of claim 13, wherein sensing is performed during the inactive time of the sidelink DRX prior to expiration of an inactivity timer.

16. The method of claim 13, wherein sensing is performed during the inactive time of the sidelink DRX if a packet delay budget of a packet necessitates transmission of the packet before a subsequent DRX on duration.

17. The method of claim 13, wherein sensing is performed during the inactive time of the sidelink DRX if a priority associated with a packet for transmission satisfies a threshold.

18. The method of claim 13, wherein sensing is performed during the inactive time of the sidelink DRX if a quantity of retransmissions associated with a packet satisfies a threshold.

19. The method of claim 13, wherein sensing is performed during the inactive time of the sidelink DRX if the UE received an indication that a transmission of the UE conflicts with another transmission of at least one other UE.

20. The method of claim 13, further comprising:
receiving the indication to perform sensing during the inactive time of the sidelink DRX from another UE.

21. The method of claim 13, wherein the indication to perform sensing during the inactive time of the sidelink DRX is included in a wakeup signal or a go-to-sleep signal.

22. The method of claim 21, wherein the indication to perform sensing during the inactive time of the sidelink DRX and included in the wakeup signal or the go-to-sleep signal indicates one or more of:
whether the UE is to skip performing reception in an upcoming DRX on duration,
whether the UE is to skip performing sensing in an upcoming DRX on duration,
whether the UE is to skip performing sensing in an upcoming DRX cycle, or
whether the UE is to skip performing sensing after an upcoming DRX on duration.

23. The method of claim 13, wherein sensing is performed during the inactive time of the sidelink DRX based at least in part on a band in which sidelink communication of the UE is performed.

24. The method of claim 13, wherein sensing is performed during the inactive time of the sidelink DRX while operating in an active state.

25. A non-transitory computer-readable medium storing a set of instructions for wireless communication, the set of instructions comprising:
one or more instructions that, when executed by one or more processors of a user equipment (UE), cause the UE to:
receive a configuration for sidelink discontinuous reception (DRX) that indicates a DRX on duration; and
selectively perform sensing for sidelink resource selection during an inactive time of the sidelink DRX in a set of periodic partial sensing occasions only for a most-recent occasion of a periodicity associated with the set of periodic partial sensing occasions based at least in part on whether an indication to perform sensing during the inactive time of the sidelink DRX is received from a network entity,
the periodicity being indicated in a list of allowable sidelink resource reservation periodicities.

26. The non-transitory computer-readable medium of claim 25, wherein the one or more instructions, to cause the UE to perform sensing during the inactive time of the sidelink DRX, cause the UE to:
perform sensing during the inactive time of the sidelink DRX prior to expiration of an inactivity timer.

27. The non-transitory computer-readable medium of claim 25, wherein the one or more instructions, to cause the UE to selectively perform sensing during the inactive time of the sidelink DRX, cause the UE to:
perform sensing during the inactive time of the sidelink DRX if a packet delay budget of a packet necessitates transmission of the packet before a subsequent DRX on duration.

28. The non-transitory computer-readable medium of claim 25, wherein the one or more instructions, to cause the UE to selectively perform sensing during the inactive time of the sidelink DRX, cause the UE to:
perform reception during the inactive time of the sidelink DRX for use in performing sensing during the inactive time of the sidelink DRX.

29. The non-transitory computer-readable medium of claim 25, wherein the one or more instructions further cause the UE to:
receive the indication, to perform sensing during the inactive time of the sidelink DRX, from another UE.

30. An apparatus for wireless communication, comprising:
means for receiving a configuration for sidelink discontinuous reception (DRX) that indicates a DRX on duration; and
means for selectively performing sensing for sidelink resource selection during an inactive time of the sidelink DRX in a set of periodic partial sensing occasions only for a most-recent occasion of a periodicity associated with the set of periodic partial sensing occasions based at least in part on whether an indication to perform sensing during the inactive time of the sidelink DRX is received from a network entity,
the periodicity being indicated in a list of allowable sidelink resource reservation periodicities.

* * * * *